US008786659B2

(12) United States Patent
Hoory et al.

(10) Patent No.: US 8,786,659 B2
(45) Date of Patent: Jul. 22, 2014

(54) DEVICE, METHOD AND COMPUTER PROGRAM PRODUCT FOR RESPONDING TO MEDIA CONFERENCE DEFICIENCIES

(75) Inventors: Ron Hoory, Haifa (IL); Michael Rodeh, Haifa (IL); Slava Shechtman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 13/481,973

(22) Filed: May 29, 2012

(65) Prior Publication Data

US 2012/0239746 A1   Sep. 20, 2012

Related U.S. Application Data

(63) Continuation of application No. 11/970,534, filed on Jan. 8, 2008, now Pat. No. 8,228,359.

(51) Int. Cl.
*H04N 7/14* (2006.01)
(52) U.S. Cl.
USPC ........................ 348/14; 348/14.08; 348/14.09
(58) Field of Classification Search
USPC ....................... 348/14.01–14.16, 21
See application file for complete search history.

(56) References Cited

U.S. PATENT DOCUMENTS 7,187,764 B2   3/2007   Ruetschi

FOREIGN PATENT DOCUMENTS

| EP | 1672898 A2 | 6/2006 |
| JP | 2004120460 A2 | 4/2004 |
| JP | 2005269498 A2 | 9/2005 |
| WO | WO2007005156 A2 | 1/2007 |

*Primary Examiner* — Suhan Ni
(74) *Attorney, Agent, or Firm* — Daniel Kligler

(57) ABSTRACT

A method for responding to media conference deficiencies, the method includes: monitoring, by at least one receiver, a quality of media conference signals being received by at least one receiver during the media conference; sending, in response to the monitoring, to at least an end user transmitter that transmitted the media conference signals, a quality indication representative of a quality of the received media conference signals; recording inadequately received media conference signals that were inadequately received by a certain end user receiver and participating in an activity related to a transmission, to the certain end user receiver, of the inadequately received media conference signals or of a representation of the inadequately received media conference signals.

23 Claims, 3 Drawing Sheets

DEVICE, METHOD AND COMPUTER PROGRAM PRODUCT FOR RESPONDING TO MEDIA CONFERENCE DEFICIENCIES

CROSS-REFERENCE TO RELATED APPLICATION

This application is a continuation of U.S. patent application Ser. No. 11/970,534, filed Jan. 8, 2008.

FIELD OF THE INVENTION

The present invention relates to methods, systems and computer program products for responding to media conference deficiencies.

BACKGROUND OF THE INVENTION

Media conferences such as phone conferences or a video conference are subjected to various communication deficiencies and user originating deficiencies. Typical deficiencies include, for example, poor lighting for video content, talking while being outside the reception range of a microphone, speaker switching, talking while in a noisy environment, communication channel problems (e.g. echoing, packet loss) or inappropriate streaming reproduction at a receiver (e.g. bad speaker-phone or video screen).

Media conference participants can temporarily experience inadequate reception of media conference signals that are exchanged during the media conference. Once the inadequate reception ends at least one end user can either terminate the media conference or continue to participate in the media conference without being aware of the inadequately received media content.

These mentioned above phenomena reduce the attractiveness of media conferences.

There is a growing need to provide efficient devices, methods and computer program products for responding to media conference deficiencies.

SUMMARY OF THE PRESENT INVENTION

A method for responding to media conference deficiencies, the method includes: monitoring, by at least one receiver, a quality of media conference signals being received by at least one receiver during the media conference; sending, in response to the monitoring, to at least an end user transmitter that transmitted the media conference signals, a quality indication representative of a quality of the received media conference signals; recording inadequately received media conference signals that were inadequately received by a certain end user receiver and participating in an activity related to a transmission, to the certain end user receiver, of the inadequately received media conference signals or of a representation of the inadequately received media conference signals.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
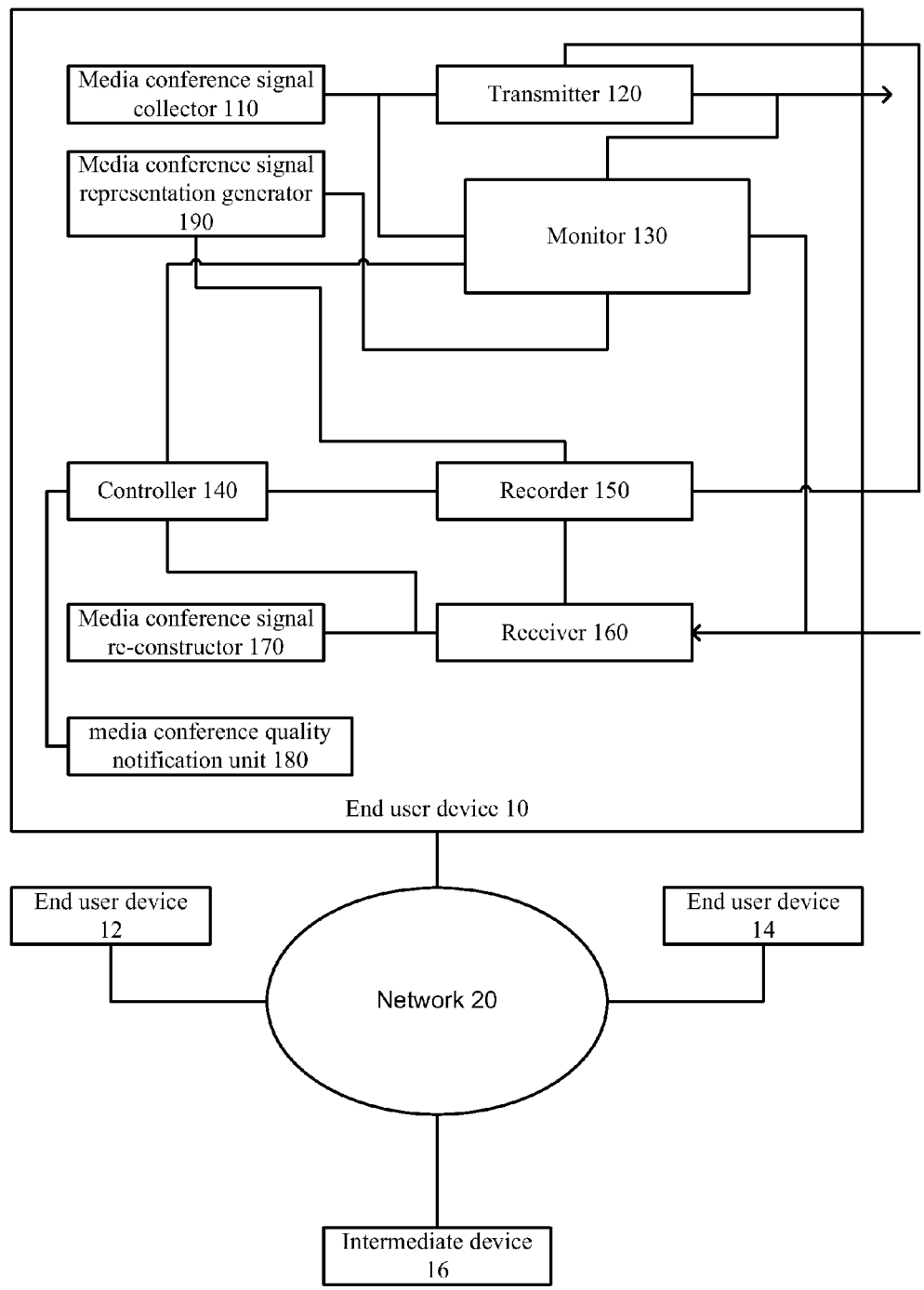
FIG. 1 illustrates multiple end user devices, a network and an intermediate device, according to an embodiment of the invention.

The term "media conference" includes a video conference or a conference call. Two or more end users can participate in a media conference. Media conference signals are sent, during a media conference, from one end user device to one or more other end user devices. Media conference signals can, for example, include visual content or audio content.

The term "inadequately received media conference signals" includes media conference signals that were not adequately received by an end user receiver.

The term "missed media conference signals" includes media conference signals that were not received in real time by an end user receiver or were not played in real time to the end user due to a playback of inadequately received media conference signals or a representation of the inadequately received media signals.

The present invention provides a method, device and computer program product for responding to media conference deficiencies. One or more receivers monitor the quality of media conference signals that are transmitted from an end user transmitter to one or more end user receivers. The quality of the media conference signals (as received by one or more receivers) is measured. Quality indicators are then sent to the end user transmitter and enable the end user (of the end user transmitter) to amend some media conference deficiencies. In addition, a quality indicator (or the absence of such quality indicator) can indicate that a certain end user receiver does not receive the media conference signals in an adequate manner. The media conference signals that were not adequately received by that certain end user receiver are recorded. The inadequately received media conference signals can be sent to the certain end user receiver after it resumes receiving in an adequate manner.

It is noted that the media conference signals can be received by multiple receivers and that their quality (as received by each receiver) can be measured by at least some of these receivers. These receives can be end user receivers, receivers of intermediate devices (such as a bridge) or a combination thereof.

The media conference signals that were detected as not adequately received can be recorded, stored and retransmitted. These can be optionally converted (before being recorded or after being stored) to provide their representation.

A representation of the media conference signals can be generated by a lossless process, a loss prone process or a combination thereof. Non limiting examples of media conference signal representations includes, a compressed version of the media conference signals, a speeded up version of media conference signals; a text that represents an auditory portion of the media conference, a text that represents the video portion of the media conference, an auditory representation of received media conference signals, a video representation of received media conference signals or a combination thereof. The representation can be generated, for example, by compressing the media conference signals, by altering the type of media conference signals (for example from speech signals to textual signals), by generating a speeded up media conference session and the like.

One or more device can transmit the whole media conference signal representation, a portion of that representation, the whole inadequately received media conference signals or a portion of the inadequately received media conference signals. The representation can be transmitted in a centralized manner or by using peer to peer technology.

FIG. 1 illustrates multiple end user devices 10, 12 and 14, network 20 and intermediate device 16, according to an embodiment of the invention.

Intermediate device 16 and end user devices 10, and 14 are connected to each other via network 20. Intermediate device 16 can be a bridge and can be a part of network 20. It is noted that connecting between end user devices of media conferences is known in the art. Those of skill in the art will appreciate that the number of end user devices that participate in a media conference as well as the connectively between these end user devices can change without departing from the scope of the invention. It is noted that end user devices 10, 12 and 14 can be connected to each other without intermediate device 16.

For simplicity of explanation only the components of end user device 10 are illustrated in greater details. It is noted that end user device 14 and 16 can be analogues to end user device 10. It is also noted that intermediate device 16 can include multiple components (and optionally all of the components) of end user device 10. For example, intermediate device 10 can monitor the quality of media conference signals that are exchanged between end user devices, it can record media conference signals and, additionally or alternatively generate a representation of inadequately received media conference signals.

End user device 10 includes media conference signal collector 110, transmitter 120, monitor 130, controller 140, recorder 150, receiver 160, media re-constructor (also referred to as media conference signal re-constructor) 170, media conference quality notification unit 180 and media conference signal representation generator 190. Each of these components can be implemented in software, hardware, firmware, middleware or a combination thereof. For example, end user device 10 can be a soft phone as well as a modern telecommunication device. It is noted that some of these components can be integrated with other components.

Media conference signal collector 110 is connected to transmitter 120 and to monitor 130. Media conference signal collector 110 can collect media conference signals. It can be a microphone, audio capture device, a camera or a video capture device.

Monitor 130 is also connected to controller 140, to receiver 160, to media re-constructor 170 and to media conference quality notification unit 180. Recorder 150 is connected to controller 140, to receiver 160 and to media conference signal representation generator 190. Media re-constructor 170 is also connected to media conference quality notification unit 180. Additionally or alternatively, media conference signal representation generator 190 can be connected to transmitter 120 in order to generate a representation of transmitted media conference signals.

Media conference signal representation generator 190 generates a representation of media conference signals that are either being received (inbound or received media conference signals) by end device 10, and additionally or alternatively, of media conference signals that are being transmitted (outbound or transmitted media conference signals) by end device 10. Media conference signal representation generator 190 can be, for example, a textual representation generator that adapted to generate a textual representation of the inadequately received media conference signals. It is noted that media conference signal representation generator 190 can generate other representations of the media conference signals.

Transmitter 120 transmits: (i) media conference signals (also referred to as transmitted media conference signals) that are destined to end user devices 12 and 14; (ii) one or more quality indicators that reflect the quality of these transmitted media conference signals; (iii) one or more quality indicators that represent a quality of media conference signals (also referred to as received media conference signals) that were received by end user device 10 and originated from end user devices 12 and 14. Transmitter 120 can also transmit inadequately received media conference signals, a portion of inadequately received media conference signals, a representation of inadequately received media conference signals or a portion of the representation of the inadequately received media conference signals.

Receiver 160 receives the received media conference signals (originated from either one of end user devices 12 and 14) and one or more quality indicators that reflect the quality of the received media conference signals as measured by the end user device that transmitted these signals.

Monitor 130 monitors the quality of transmitted media conference signals and the quality of the received media conference signals. Monitor 130 can generate quality indicators that represent the quality of at least one of the following signals: transmitted media conference signals, received media conference signals, collected media conference signals and reproduced media stream signals.

Controller 140 receives quality indicators and in response to the quality indicators determines an inadequate reception period during which a certain end user receiver (of either end user device 12 or end user device 14) inadequately received media conference signals. Controller 140 can instruct recorder 150 to record media conference signals exchanged during the inadequate reception period. It is noted that the recorder 150 can be ordered to record not only transmitted media conference signals that were transmitted by transmitter 120 but also received media conference signals that were adequately received by receiver 160 at end user device 10 while inadequately being received by end user device 12 or 14.

Once the inadequate reception period ends end user device 10 can participate in an activity related to a transmission to the certain end user device. These activities can involve inadequately received media conference signals (or their representation) and, additionally or alternatively, media conference signals that are exchanged during a playback of the inadequately received media conference signals (or their representation). For simplicity of explanation the following examples refer to inadequately received media conference signals.

This participation can include, for example, at least one of the following: (i) sending to the certain end user device media conference signals recorded by end user device 10; (ii) sending to the certain end user device a representation (for example a textual representation, a compressed representation, a speeded-up representation) of at least the inadequately received media conference signals recorded by end user device 10; (iii) sending to the certain end user device a portion of the inadequately received media conference signals recorded by end user device 10; (iv) sending to the certain end user device a portion of the representation of inadequately received media conference signals recorded by end user device 10; (v) participating in a selection process that determines which device (out of the devices that recorded the media conference signals) should transmit which media conference signals out of the at least inadequately received media conference signals, (vi) participating in a selection process that determines which device (out of the devices that recorded the media conference signals) should transmit which representation of media conference signals out of (at least) the inadequately received media conference signals.

Accordingly, end user device 10 is adapted to record media conference content from a point in time that corresponds to a beginning of an inadequate reception period of the media conference content by the certain end user receiver. When the inadequate reception period is over a user of the certain end user can select between various causes of action. He can select to listen to the recorded media conference content immediately. He can select to perform a playback during which he can listen to a representation of the recorded media conference content substantially immediately. He can continue the usual course of the conference call and optionally listen (during playback) to the recorded media conference content later on (for example—at the end of the call). A user that is not expected to participate in the conference call (at least after the beginning of the inadequate reception) can receive a delayed version of the media conference signals.

If the user elects to receive (and then playback) a delayed version then end user device 10 sends to that certain end user device the delayed version of the recorded media conference signals. The certain end user can also elect to receive a representation of the inadequately received media conference signals, and especially a representation (such as a textual representation or a speeded up representation) that will allow him to close the gap with the other end users that participate in the media conference.

Accordingly, recorded media conference signals can be speeded up prior to their transmission (the speed-up can be implemented by applying well known methods such as but not limited to time-scale modification techniques, silence removal and the like.). Conveniently, the recorded media conference signals can be converted to textual representation using well known automatic speech recognition techniques. The textual representation can be transmitted to the end user receiver.

During the playback of the inadequately received media conference signals (or a representation thereof) missed media conference signals can be exchanged between end user devices. These missed media conference signals (or a representation thereof) are recorded and sent to the certain end user.

End user device 10 continues the recording until the certain receiver synchronizes back to the usual flow of the call. When the recorded media conference signals are speeded up, that will naturally occur after a certain period of time. During playback, the user can control the speed up factor of the recorded conference media, and that control parameter is sent to the end user device 10. During the delayed playback state, that certain receiver will be automatically set to mute state. Alternatively the end user device 10 sends a textual representation of the recorded media conference signals. In that case the certain receiver can immediately reconnect to the call (while reading in parallel the content he missed).

It is noted that the selection process can involve selecting a source of the inadequately received media conference signals (or representation of the inadequately received media conference signals) in response to a predefined selection scheme, in response to a predefined priority, in response to the quality of these media conference signals (as received by the end user devices), in response to a resource allocation scheme, in response to a peer to peer algorithm, and the like.

The transmission of quality indicators requires very small bandwidth, especially in relation to the bandwidth required to convey the media conference signals. The very small bandwidth can be limited to tens or few hundred bits per second, and therefore, it can usually be transmitted securely even when the communication channel quality degrades.

According to an embodiment of the invention the quality indicators can be transmitted over the same (physical or virtual) communication channels as the media conference signals. This may also applied to the reception of media conference signals and quality indicators. For example, both the quality indicators and the media conference signals can be transmitted "in-band".

According to another embodiment of the invention different communication channels are used for the transmission (and additionally or alternatively to the reception) of media conference signals and of the quality indicators. In this case the more than one transmitter (or receiver—in case of reception) can be included in each end user device. For example— the media conference signals can be transmitted (or received) "in-band" while the quality indicators can be transmitted (or received) "out of band".

For simplicity of explanation FIG. 1 illustrates a single transmitter and a single receiver.

Media conference quality notification unit 180 can provide an audio quality notification and, additionally a video quality notification to the end user that uses end user device 10. A quality notification (visual or audio) provides a notification about the quality of transmitted media conference signals, the quality of received media conference signals or a combination thereof. Media conference quality notification unit 180 can include a display, a speakerphone or a combination thereof.

The notification can be provided in one or more available manners. For example, a quality notification is generated once a quality of media conference signals is below one or more predefined quality levels. Yet for another example, the quality notification can be generated even if the quality of the media conference signals is above the one or more predetermined quality levels. The characteristics of a quality indicator (for example–signal volume, voice quality merit, video quality merit, noise and echo level, etc.) can alter in response to the quality of the media conference signals.

Separate quality notifications can be assigned for received media conference signals and for transmitted media conference signals.

Conveniently, the media conference quality notification unit 180 can also provide a recording indication that indicates that end user device 10 is recording media conference signals. The recording can be initiated by an inadequate reception of media conference signals by another device or by a caching algorithm that cache media conference content for other purposes. Such caching can be useful for a period between the beginning of the inadequate reception of media conference content and until end user device 10 recognizes that the inadequate reception started.

Those of skill in the art will appreciate that if the quality of transmitted media conference signals (or optionally media conference signals received by media conference signal collector 110) can assist the end user to amend deficiencies that may result from the user. These deficiencies can include, for example, turning off the light, being too distant from the media collector, not shutting a source of audio information that shouldn't be transmitted to the conference attendees, and the like. The quality of transmitted (or collected) media conference signals can also indicate that the media conference signal collector or the transmitters malfunction or that they do not communicate properly with each other.

According to an embodiment of the invention end user device 10 can perform some error correction (or error reduction) measures. For example, preventing transmitter 120 from transmitting media conference signals that are below a certain quality level, muting end user device 10, and the like. Controller 140 can perform these operations but this is not necessarily so. It is noted that the media conference signals can be buffered before being transmitted towards network 20, thus allowing end user device 10 to determined whether to transmit these signals or not, based upon their quality.

Referring to FIG. 1, various optional scenarios can occur. For example, end users devices 10 and 14 can exchange media conference signals during an inadequate reception period of end user device 12. At least one of end user devices 10 and 14 and intermediate device 16 can record the exchanged conference signals. After the end of that inadequate reception period one or more device out of end user device 10, end user device 14 and intermediate device 16 can transmit (to end user device 10) inadequately received media conference signals (or a representation thereof).

The transmission can involve one of the following or a combination thereof: (i) each end user device transmits media conference signals that were originally transmitted by him; (ii) an end user device transmits media conference signals that were received and recorded by him, (iii) intermediate device 16 can transmit media conference signals received by him.

It is noted that each of these devices (10, 14 and 16) can transmit only a portion of the media conference signals (or their representations) that were exchanged during the inadequate reception period.

It is noted that end user device can record transmitted media conference signals, in case that it will have to re-transmit such signals. It is further noted that recorder 150 can cache media conference content for various purposes. For example, received media conference signals can be cached in order to compensate for time gaps between a beginning of an inadequate reception (of another end user device) and the time in which end user device 10 recognizes that the inadequate reception period started.

Figure 2:
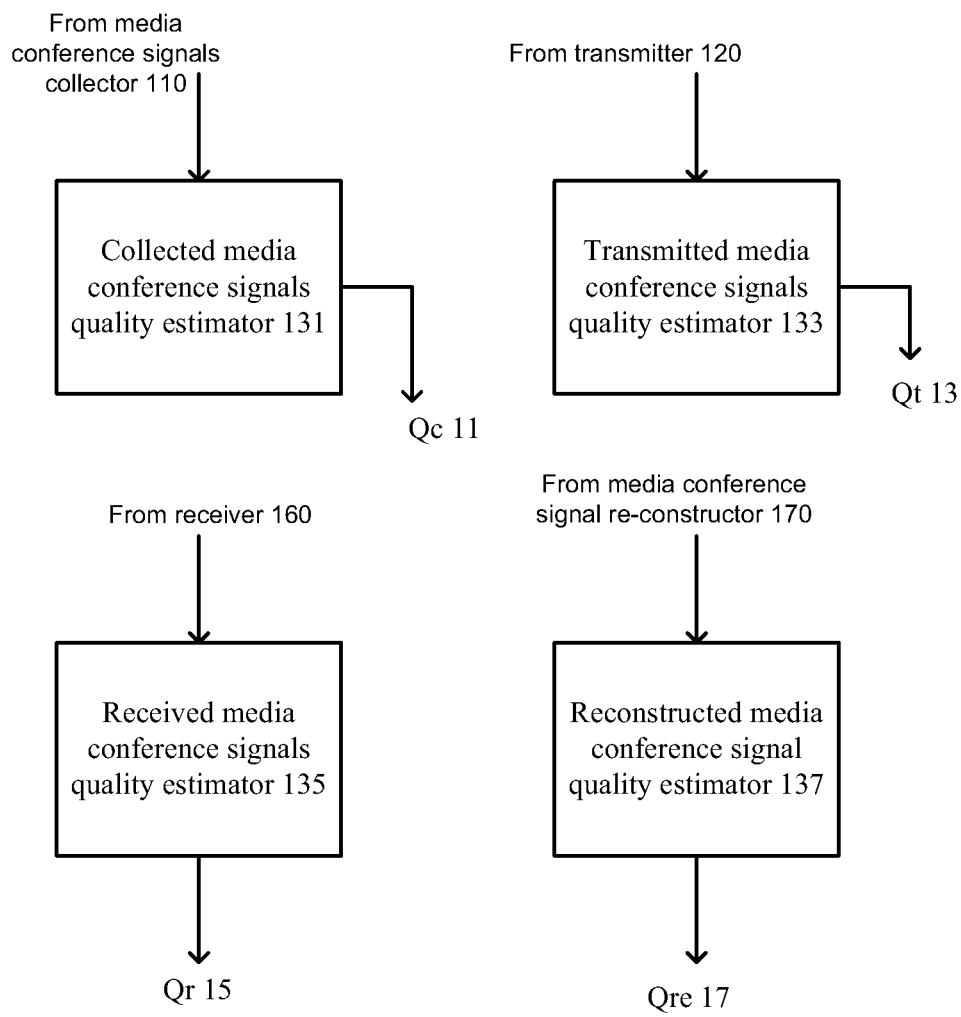
FIG. 2 illustrated a monitor according to an embodiment of the invention.

FIG. 2 illustrates monitor 10 according to an embodiment of the invention.

Monitor 130 conveniently includes the following quality estimators: collected media conference signals quality estimator 131, transmitted media conference signals quality estimator 133, received media conference signals quality estimator 135 and reconstructed media conference signal quality estimator 137. Monitor 130 may also include a storage unit or be connected to a storage unit that temporarily stores quality indicators and/or media conference signals that are being evaluated by monitor 130.

Each of these quality estimators can utilize various quality estimation algorithms. Conveniently algorithms that are not based upon reference signals are used. The following US patents and patent applications illustrate various prior art methods and devices for quality estimation: U.S. Pat. No. 7,024,352 titled "Method and device for objective speech quality assessment without reference signal"; U.S. Pat. No. 7,092,880 titled "Apparatus and method for quantitative measurement of voice quality in packet network environments"; US patent application publication serial number 20060224387A1 titled "Non-intrusive speech-quality assessment"; U.S. Pat. No. 7,170,933 titled "Method and system for objective quality assessment of image and video streams" and U.S. Pat. No. 6,285,797 titled "Method and apparatus for estimating digital video quality without using a reference video".

Collected media conference signals quality estimator 131 estimates the quality of media conference signals as being received by media conference signal collector 110. It generates collected quality estimator Qc 11.

Transmitted media conference signals quality estimator 133 estimates the quality of media conference signals that are transmitted (or going to be transmitted) by transmitter 120. It generates transmitted quality estimator Qt 13.

Received media conference signals quality estimator 135 estimates the quality of media conference signals that are received by receiver 160. It generates received quality estimator Qr 15.

Reconstructed media conference signal quality estimator 137 estimates the quality of media conference signals that are reconstructed by media re-constructor 170. It generates reconstructed quality estimator Qre 17.

It is noted that either one of Qc 11, Qt 13, Qre can be sent to controller 140 and to media conference quality notification unit 180. Controller 140 and media conference quality notification unit 180 can also receive Qrm 19 that indicates how another end user device received media conference signals that originated from another end user device.

By comparing between these various quality indicators end user device 10 and, additionally or alternatively the end user that operates end user device 10 can be aware of deficiencies and try to amend them. Various deficiencies and amendments were mentioned in relation to FIG. 1. Just for an example if Qc substantially differs from Qt then end user device can experience an error. Yet for another example, if Qt or Qc are below a predefined quality level then end user device 10 can determine not to transmit media conference signals.

Figure 3:
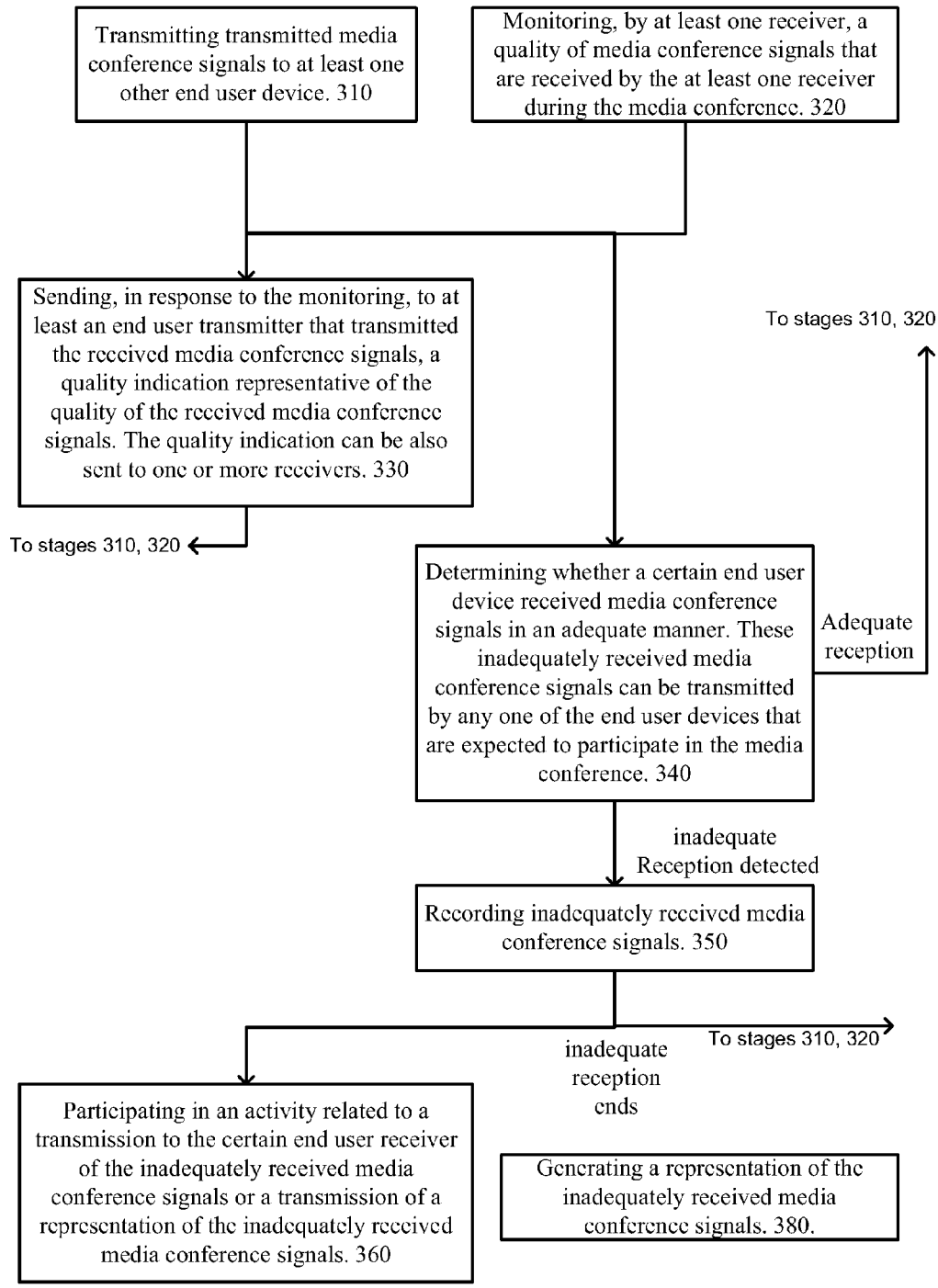
FIG. 3 is a flow chart of a method for responding to media conference deficiencies, according to an embodiment of the invention.

FIG. 3 illustrates method 300 for responding to media conference deficiencies, according to an embodiment of the invention.

According to various embodiments of the invention either one of end user devices 10, 12 and 14 and intermediate device 16 of FIG. 1 can execute one or more stages of method 300.

Method 300 starts by stages 310 and 320.

Stage 310 includes transmitting transmitted media conference signals to at least one other end user device.

Stage 320 includes monitoring, by at least one receiver, a quality of media conference signals that are received by the at least one receiver during the media conference. These media conference signals are referred to as received media conference signals.

Conveniently, stage 320 of monitoring the quality of media conference signals can be executed by an intermediate device that is connected to an end user transmitter and to multiple end user receivers.

Conveniently, stage 320 of monitoring can include monitoring a quality of media conference signals received by a media conference signal collector connected to the end user transmitter, monitoring a quality of media conference signals transmitted from the end user transmitter; and sending to the end user quality notifications representative of the results of the monitoring.

Stages 310 and 320 are followed by stages 330 and 340.

Stage 330 includes sending, in response to the monitoring, to at least an end user transmitter that transmitted the received media conference signals, a quality indication representative of the quality of the received media conference signals. The quality indication can be also sent to one or more receivers.

Stage 340 includes determining whether a certain end user device received media conference signals in an adequate manner. These inadequately received media conference signals can be transmitted by any one of the end user devices that are expected to participate in the media conference.

If an inadequate reception occurred then stage 340 is followed by stage 350 of recording inadequately received media conference signals. Else, stage 340 can be followed by either one of stages 310 and 320.

Conveniently, stage 350 of recording the inadequately received media conference signals can be executed by at least one end user device out of the end user transmitter and at least one end user receiver (assuming that that receiver receives the media conference signals at an adequate quality).

Stage 350 is followed by stage 360 of participating in an activity related to a transmission to the certain end user receiver of the inadequately received media conference signals or a transmission of a representation of the inadequately received media conference signals. Conveniently, stage 360 also includes participating in an activity related to a transmission to the certain end user receiver of the missed media conference signals or a transmission of a representation of the missed media conference signals.

Stage 360 can include at least one of the following stages: (i) sending to the certain end user device inadequately received media conference signals; (ii) sending to the certain end user device a representation (for example a textual representation, a compressed representation, a speeded-up representation) of inadequately received media conference signals; (iii) participating in a selection process that determines which device (out of the devices that recorded the media conference signals) should transmit these inadequately received media conference signals (or a representation of these signals) to the certain end user device; (iv) transmitting to the certain end user device a delayed version of the media conference that includes the inadequately received media conference signals (or a representation thereof); (v) sending to the certain end user device a representation (for example a textual representation, a compressed representation, a speeded-up representation) of inadequately received media conference signals; (vi) sending to the certain end user device missed media conference signals; (vii) sending to the certain end user device a representation (for example a textual representation, a compressed representation, a speeded-up representation) of missed media conference signals; (viii) participating in a selection process that determines which device (out of the devices that recorded the media conference signals) should transmit these missed media conference signals (or a representation of these signals) to the certain end user device; (ix) transmitting to the certain end user device a delayed version of the media conference that includes the missed media conference signals (or a representation thereof); (x) sending to the certain end user device a representation (for example a textual representation, a compressed representation, a speeded-up representation) of missed media conference signals.

Conveniently, method 300 also includes stage 380 of generating a representation of the inadequately received media conference signals. Stage 380 conveniently includes generating a textual representation of the inadequately received media conference signals and transmitting the textual representation to the certain end user receiver. It is noted that various representations of media conference signals were mentioned above and can be performed during stage 380.

Conveniently, stage 380 includes generating a representation of the missed media conference signals. Stage 380 conveniently includes generating a textual representation of the missed media conference signals and transmitting the textual representation to the certain end user receiver. It is noted that various representations of media conference signals were mentioned above and can be performed during stage 380.

It is noted that at least one stage of method 300 can be executed by an end user device and. additionally or alternatively, that at least one stage of method 300 can be executed by an intermediate device.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Conveniently, a computer program product is provided. The computer program product includes a computer usable medium that includes a computer readable program, wherein the computer readable program when executed on a computer causes the computer to The computer readable program can cause the computer to execute one or more stages of method 300.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We Claim:

1. A method for responding to media conference deficiencies in a media conferencing network including a plurality of end user devices, the method comprising:
   receiving, by a controller of the media conferencing network, quality indications of the media conference signals received by a plurality of end user devices;
   detecting, by the controller, a period in which the media conference signals are not adequately received by a first end user device;
   selecting a second end user device adequately receiving the media conference signals during the detected period; and
   instructing the second end user device to transmit, during the media conference, a copy or representation of the media conference signals not adequately received by the first end user device, to the first end user device.

2. The method of claim 1, wherein selecting the second end user device comprises selecting from a plurality of different units including an end user device generating and transmitting the signals not adequately received by a first end user device.

3. The method of claim 1, wherein selecting the second device comprises selecting responsive to comparing the quality of the signals at a plurality of devices.

4. The method of claim 1, wherein the copy or representation of the media conference signals comprises a textual representation of the not adequately received media conference signals.

5. The method of claim 1, wherein the copy or representation of the media conference signals comprises a speeded up representation of the not adequately received media conference signals.

6. The method of claim 1, wherein detecting the period in which the media conference signals are not adequately received comprises comparing quality measures of signals in a plurality of different devices of the network.

7. A method for responding to media conference deficiencies in a media conferencing network including a plurality of end user devices, the method comprising:
    receiving media conference signals by a first device of the network, during a media conference;
    presenting the received media conference signals to a user, the presented media conference signals including a period in which the media conference signals are not adequately received by the user;
    receiving, by the first device, during the media conference, a copy or a representation of the media conference signals not adequately received; and
    presenting the copy or representation to the user.

8. The method of claim 7, and comprising:
    monitoring a quality of the received media conference signals by the first device;
    detecting, by the first device, the period in which the media conference signals are not adequately received; and
    transmitting from the first device to a second device of the network a request to provide the copy or representation of the media conference signals not adequately received, responsively to the detection of the period.

9. The method of claim 8, wherein detecting the period in which the media conference signals are not adequately received comprises comparing quality measures of signals in a plurality of different devices of the network.

10. The method of claim 7, comprising transmitting from the first device to a second device of the network, a quality measure of the received signals.

11. The method according to claim 7, wherein presenting the copy or representation to the user comprises presenting, upon reception, during the media conference.

12. The method according to claim 7, wherein presenting the copy or representation to the user comprises presenting, after completing the media conference.

13. The method according to claim 7, wherein receiving a copy or representation of the not adequately received media conference signals comprises receiving a textual representation of the not adequately received media conference signals.

14. The method according to claim 7, wherein receiving a copy or representation of the not adequately received media conference signals comprises receiving a speeded up representation of the not adequately received media conference signals.

15. A media conference device of a media conference network, comprising:
    a receiver adapted to receive media conference signals during a media conference;
    a recorder adapted to record a copy or representation of media conference signals received by the receiver;
    a transmitter adapted to transmit a copy or representation of media conference signals recorded by the recorder; and
    a controller adapted to receive an indication of media conference signals not adequately received by a second device of the network and to control the transmitter to transmit to the second device a copy or representation of the indicated media conference signals, using the signals recorded by the recorder.

16. The device of claim 15, wherein the receiver is adapted to receive the media conference signals recorded by the recorder through a network interface.

17. The device of claim 15, wherein the receiver is adapted to receive the media conference signals recorded by the recorder through a media conference signal collector.

18. The device of claim 15, wherein the recorder is adapted to cache the signals received by the receiver for a predetermined time.

19. The device of claim 18, wherein the recorder is adapted to cache the signals for a time required to allow for time gaps between a beginning of an inadequate reception and recognizing that the inadequate reception period started.

20. The device of claim 15, wherein the device comprises an intermediate device not serving as an end user device.

21. The device of claim 15, wherein the device is adapted to present the received media conference signals to a user in parallel to the recording the signals by the recorder.

22. The device of claim 15, wherein the copy or representation of the indicated media conference signals comprises a textual representation of the not adequately received media conference signals.

23. The device of claim 15, wherein the copy or representation of the indicated media conference signals comprises a speeded up representation of the not adequately received media conference signals.

* * * * *